(12) United States Patent
Yamada et al.

(10) Patent No.: US 9,685,661 B2
(45) Date of Patent: Jun. 20, 2017

(54) SECONDARY BATTERY, ELECTRONIC DEVICE, ELECTRIC POWER TOOL, ELECTRICAL VEHICLE, AND ELECTRIC POWER STORAGE SYSTEM

(75) Inventors: Ichiro Yamada, Fukushima (JP); Hideki Nakai, Fukushima (JP); Toshio Nishi, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 969 days.

(21) Appl. No.: 13/452,333

(22) Filed: Apr. 20, 2012

(65) Prior Publication Data

US 2012/0288772 A1  Nov. 15, 2012

(30) Foreign Application Priority Data

May 11, 2011 (JP) .................... 2011-106200

(51) Int. Cl.

| | |
|---|---|
| *H01M 6/16* | (2006.01) |
| *H01M 4/62* | (2006.01) |
| *H01M 10/0525* | (2010.01) |
| *H01M 10/0568* | (2010.01) |
| *H01M 4/13* | (2010.01) |
| *H01M 10/0569* | (2010.01) |
| *H01M 2/16* | (2006.01) |

(52) U.S. Cl.
CPC ............... *H01M 4/62* (2013.01); *H01M 4/13* (2013.01); *H01M 10/0525* (2013.01); *H01M 10/0568* (2013.01); *H01M 10/0569* (2013.01); *H01M 2/1686* (2013.01); *Y02E 60/122* (2013.01); *Y02T 10/7011* (2013.01)

(58) Field of Classification Search
CPC ......... H01M 10/0564; H01M 10/0565; H01M 10/0566; H01M 10/0568; H01M 10/0569; H01M 4/62; H01M 4/13
See application file for complete search history.

(56) References Cited

U.S. PATENT DOCUMENTS

| | | | | |
|---|---|---|---|---|
| 6,045,951 | A | * | 4/2000 | Wendsjo et al. ............. 429/307 |
| 6,383,688 | B1 | * | 5/2002 | Inagaki et al. ............. 429/322 |
| 2002/0028379 | A1 | * | 3/2002 | Okada ................... H01M 4/133 |
| | | | | 429/137 |
| 2008/0166637 | A1 | * | 7/2008 | Inagaki et al. ............. 429/329 |
| 2009/0061325 | A1 | * | 3/2009 | Odani et al. ................. 429/330 |

FOREIGN PATENT DOCUMENTS

| | | |
|---|---|---|
| CN | 1283315 | 2/2001 |
| CN | 101997102 | 3/2011 |
| JP | 01-286262 | 11/1989 |
| JP | 05-054887 | 3/1993 |

(Continued)

OTHER PUBLICATIONS

JP 2002015771 ENG Translation, Translated by JPO on Jan. 9, 2015.*

(Continued)

*Primary Examiner* — Nicholas P D'Aniello
*Assistant Examiner* — Jimmy K Vo
(74) *Attorney, Agent, or Firm* — K&L Gates LLP

(57) ABSTRACT

A secondary battery includes a cathode, an anode, and an electrolytic solution. The anode or the electrolytic solution, or both contain a metal salt including an unsaturated carbon bond.

11 Claims, 4 Drawing Sheets

(56) References Cited

FOREIGN PATENT DOCUMENTS

| | | | | |
|---|---|---|---|---|
| JP | 05-054912 | 3/1993 | | |
| JP | 05-226003 | 9/1993 | | |
| JP | 10-308241 | 11/1998 | | |
| JP | 2000-215910 | 8/2000 | | |
| JP | 2002015771 A * | 1/2002 | ............ | H01M 10/40 |
| JP | 2002-289256 | 10/2002 | | |
| JP | 2003-297419 | 10/2003 | | |
| JP | 2006-019127 | 1/2006 | | |
| JP | 2006-086058 | 3/2006 | | |
| JP | 2006-318815 | 11/2006 | | |
| JP | 4365013 | 11/2009 | | |
| JP | 2010-262801 | 11/2010 | | |
| JP | 2012-238459 | 12/2012 | | |
| WO | 99/34471 | 7/1999 | | |

OTHER PUBLICATIONS

Notification of Reason(s) for Refusal issued in connection with Japanese Patent Application No. 2011-106200, dated Oct. 1, 2014. (8 pages).
Office Action issued in Japanese Application 2011106200 mailed Aug. 4, 2015 (6 pages).
Notification of the First Office Action issued in connection with Chinese Patent Application No. 2012101505589, dated Jun. 2, 2015. (24 pages).
Notification of Reason(s) for Refusal issued in connection with Japanese Patent Application No. 2011-106200, dated May 26, 2015. (6 pages).

* cited by examiner

SECONDARY BATTERY, ELECTRONIC DEVICE, ELECTRIC POWER TOOL, ELECTRICAL VEHICLE, AND ELECTRIC POWER STORAGE SYSTEM

CROSS REFERENCES TO RELATED APPLICATIONS

The present application claims priority to Japanese Priority Patent Application JP 2011-106200 filed in the Japan Patent Office on May 11, 2011, the entire content of which is hereby incorporated by reference.

BACKGROUND

The present application relates to a secondary battery including a cathode, an anode, and an electrolytic solution, an electronic device using the same, an electric power tool using the same, an electrical vehicle using the same, and an electric power storage system using the same.

In recent years, various electronic devices such as a mobile phone and a personal digital assistant (PDA) have been widely used, and it has been strongly demanded to further reduce their size and weight and to achieve their long life. Accordingly, as a power source for the electronic devices, a battery, in particular, a small and light-weight secondary battery capable of providing a high energy density has been developed. In these days, it has been considered to apply such a secondary battery not only to the foregoing electronic devices but also to various applications represented by an electric power tool such as an electrical drill, an electrical vehicle such as an electrical automobile, and an electric power storage system such as a home electrical power server.

As the secondary battery, secondary batteries using various charge and discharge principles have been widely proposed. Specially, a secondary battery using insertion and extraction of ions such as lithium ions is considered promising, since such a secondary battery provides a higher energy density than lead batteries, nickel cadmium batteries, and the like.

The secondary battery includes a cathode, an anode, and an electrolytic solution. The cathode and the anode respectively contain a cathode active material and an anode active material that insert and extract ions such as lithium ions. In the secondary battery, in order to obtain a high battery capacity, as a solvent of the electrolytic solution, a mixed solvent of a cyclic ester carbonate and a chain ester carbonate and the like are used.

Electrolytic solution compositions largely affect performance of the secondary battery. Therefore, various studies have been made on the electrolytic solution compositions. Specifically, to improve cycle characteristics and the like, it is proposed to make the electrolytic solution contain an unsaturated carbon bond cyclic ester carbonate or a halogenated cyclic ester carbonate (for example, see Japanese Unexamined Patent Application Publication Nos. 2002-289256, 2003-297419, and 2006-086058 and Japanese Patent No. 4365013). In this case, a coat is formed on the surface of an anode, and therefore a decomposition reaction of the electrolytic solution resulting from a reaction with an anode active material is suppressed. As the unsaturated carbon bond cyclic ester carbonate, vinylene carbonate or the like is used. As the halogenated cyclic ester carbonate, 4-fluoro-1,3-dioxolane-2-one or the like is used.

SUMMARY

In these years, high performance and multi functions of the electronic devices and the like on which the secondary battery is mounted are increasingly developed. Therefore, electric power consumption of the electronic devices tends to be increased, and charge and discharge of the secondary battery tend to be frequently repeated. Accordingly, further improvement of battery capacity characteristics, cycle characteristics, and the like of the secondary battery has been desired.

In the case where the unsaturated carbon bond cyclic ester carbonate or the like is contained in the electrolytic solution, contact between the anode active material and the electrolytic solution is prevented by the coat. On the other hand, since a resistance of the anode is increased due to existence of the coat, battery characteristics are not allowed to be improved sufficiently. Such a tendency is particularly significant in the case where the ion conductivity of the electrolytic solution is increased or the viscosity of the electrolytic solution is lowered in order to improve the ion movement speed between the cathode and the anode. The tendency is also significant at the time of discharge by a large current.

Accordingly, it is aspired to take measures capable of sufficiently improving battery capacity characteristics, cycle characteristics, and the like by suppressing resistance rise of the anode. In this case, it is important not only to improve inherent battery characteristics such as the battery capacity characteristics, but also to suppress swollenness of the secondary battery due to gas generated by a decomposition reaction of the electrolytic solution.

It is desirable to provide a secondary battery capable of improving battery characteristics, an electronic device, an electric power tool, an electrical vehicle, and an electric power storage system.

According to an embodiment of the present application, there is provided a secondary battery including a cathode, an anode, and an electrolytic solution. The anode or the electrolytic solution, or both contain a metal salt including an unsaturated carbon bond.

According to an embodiment of the present application, there is provided an electronic device using a secondary battery, the secondary battery including a cathode, an anode, and an electrolytic solution. The anode or the electrolytic solution, or both contain a metal salt including an unsaturated carbon bond.

According to an embodiment of the present application, there is provided an electric power tool using a secondary battery, the secondary battery including a cathode, an anode, and an electrolytic solution. The anode or the electrolytic solution, or both contain a metal salt including an unsaturated carbon bond.

According to an embodiment of the present application, there is provided an electrical vehicle using a secondary battery, the secondary battery including a cathode, an anode, and an electrolytic solution. The anode or the electrolytic solution, or both contain a metal salt including an unsaturated carbon bond.

According to an embodiment of the present application, there is provided an electric power storage system using a secondary battery, the secondary battery including a cathode, an anode, and an electrolytic solution. The anode or the electrolytic solution, or both contain a metal salt including an unsaturated carbon bond.

"Unsaturated carbon bond" is carbon-carbon double bond or carbon-carbon triple bond or both. That is, only the carbon-carbon double bond may exist, only the carbon-carbon triple bond may exist, or both thereof may exist. The number of carbon-carbon double bonds may be one, or two or more, and the number of carbon-carbon triple bonds may be one, or two or more. In the case where one or more carbon-carbon double bonds and one or more carbon-carbon triple bonds are included, the sequence order thereof may be freely set. The metal salt may be a chain metal salt or a cyclic metal salt as long as the foregoing unsaturated carbon bond is included.

According to the secondary battery of the embodiment of the present application, the anode or the electrolytic solution or both contain the metal salt including the unsaturated carbon bond. Therefore, battery characteristics such as battery capacity characteristics, cycle characteristics, and swollenness characteristics are allowed to be improved. Further, according to the electronic device, the electric power tool, the electrical vehicle, and the electric power storage system using the foregoing secondary battery according to the embodiments of the present application, similar effects are allowed to be obtained.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the application.

DETAILED DESCRIPTION

An embodiment of the present application will be hereinafter described in detail with reference to the drawings. The description will be given in the following order.
1. Secondary Battery
  1-1. Cylindrical Type
  1-2. Laminated Film Type
2. Applications of Secondary Battery
[1. Secondary Battery/1-1. Cylindrical Type]

Figure 1:
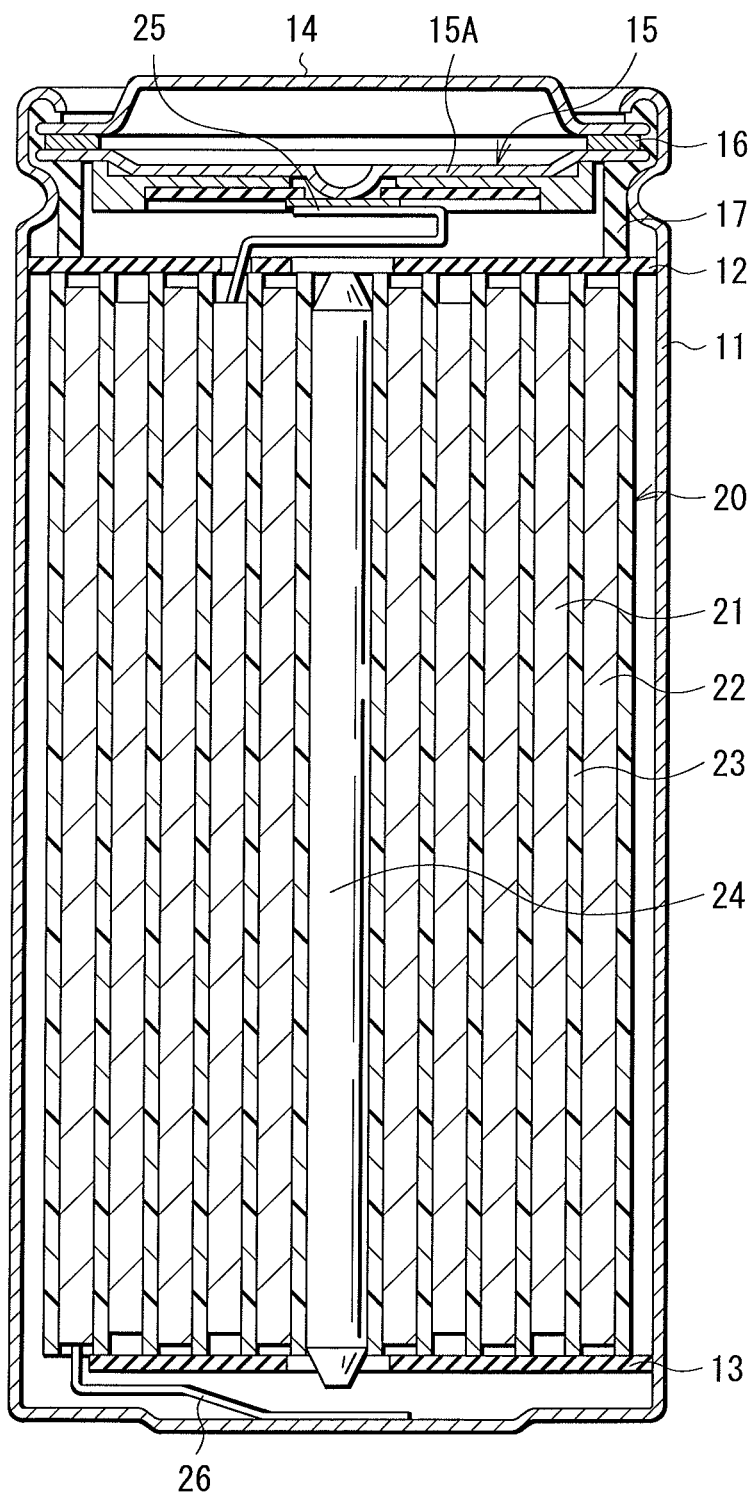
FIG. 1 is a cross-sectional view illustrating a configuration of a secondary battery (cylindrical type) according to an embodiment of the present application.
Figure 2:
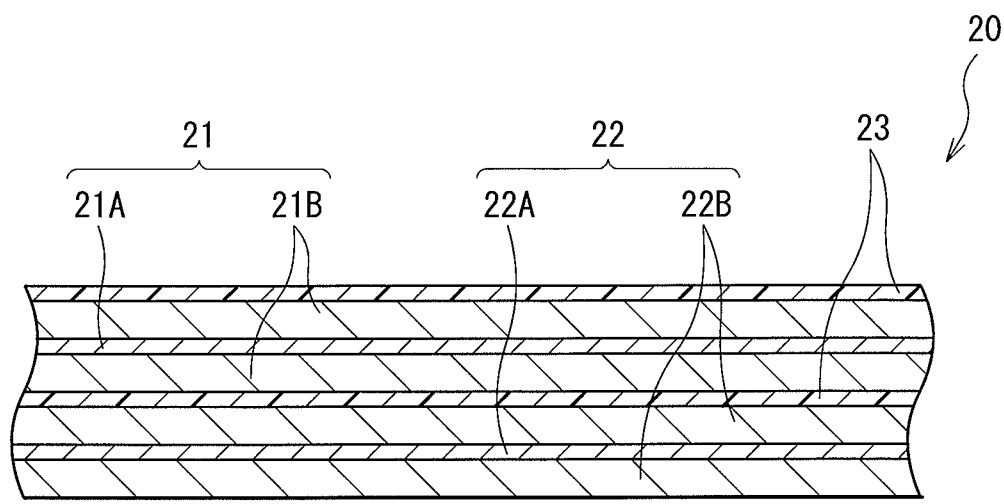
FIG. 2 is a cross-sectional view illustrating an enlarged part of a spirally wound electrode body illustrated in FIG. 1.

FIG. 1 and FIG. 2 illustrate cross-sectional configurations of a secondary battery according to an embodiment of the present application. FIG. 2 illustrates an enlarged part of a spirally wound electrode body 20 illustrated in FIG. 1.
[Whole Configuration of Secondary Battery]

The secondary battery herein described is, for example, a lithium ion secondary battery in which a battery capacity is obtained by insertion and extraction of lithium ions, and is what we call a cylindrical type secondary battery. The secondary battery contains the spirally wound electrode body 20 and a pair of insulating plates 12 and 13 inside a battery can 11 in the shape of a substantially hollow cylinder. In the spirally wound electrode body 20, for example, a cathode 21 and an anode 22 are layered with a separator 23 in between and are spirally wound.

The battery can 11 has a hollow structure in which one end of the battery can 11 is closed and the other end of the battery can 11 is opened. The battery can 11 is made of, for example, iron, aluminum, an alloy thereof, or the like. The surface of the battery can 11 may be plated with a metal material such as nickel. The pair of insulating plates 12 and 13 are arranged to sandwich the spirally wound electrode body 20 in between, and to extend perpendicularly to the spirally wound periphery surface.

At the open end of the battery can 11, a battery cover 14, a safety valve mechanism 15, and a PTC (positive temperature coefficient) device 16 are attached by being swaged with a gasket 17. Thereby, the battery can 11 is hermetically sealed. The battery cover 14 is made of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, in the case where the internal pressure becomes a certain level or more by internal short circuit, external heating, or the like, a disk plate 15A inverts to cut the electric connection between the battery cover 14 and the spirally wound electrode body 20. The PTC device 16 prevents abnormal heat generation resulting from a large current. In the PTC device 16, as temperature rises, its resistance is increased accordingly. The gasket 17 is made of, for example, an insulating material. The surface of the gasket 17 may be coated with asphalt.

In the center of the spirally wound electrode body 20, a center pin 24 may be inserted. For example, a cathode lead 25 made of a conductive material such as Al is connected to the cathode 21. For example, an anode lead 26 made of a conductive material such as Ni is connected to the anode 22. The cathode lead 25 is, for example, welded to the safety valve mechanism 15, and is electrically connected to the battery cover 14. The anode lead 26 is, for example, welded to the battery can 11, and is electrically connected to the battery can 11.
[Cathode]

In the cathode 21, for example, a cathode active material layer 21B is provided on a single surface or both surfaces of a cathode current collector 21A. The cathode current collector 21A is made of, for example, a conductive material such as aluminum, nickel, and stainless steel.

The cathode active material layer 21B contains, as a cathode active material, one type, or two or more types of cathode materials inserting and extracting lithium ions. As needed, the cathode active material layer 21B may contain other material such as a cathode binder and a cathode electrical conductor.

The cathode material is preferably an Li-containing compound, since thereby a high energy density is obtained. Examples of the Li-containing compound include a composite oxide containing Li and a transition metal element as constituent elements, and a phosphate compound containing Li and a transition metal element as constituent elements. Specially, it is preferable that the transition metal element be one type, or two or more types of Co, Ni, Mn, and Fe, since thereby a higher voltage is obtained. The chemical formula thereof is expressed by, for example, $Li_xMIO_2$ or $Li_yMIIPO_4$. In the formula, MI and MII represent one or more types of transition metal elements. Values of x and y vary according to the charge and discharge state, and are generally in the range of $0.05 \le x \le 1.10$ and $0.05 \le y \le 1.10$.

Examples of the composite oxide containing Li and a transition metal element include $Li_xCoO_2$, $Li_xNiO_2$, $LiMn_2O_4$, and an LiNi-based composite oxide represented by the following Formula (4). Examples of the phosphate compound containing Li and a transition metal element include $LiFePO_4$ and $LiFe_{1-u}Mn_uPO_4$ (u<1), since thereby a high battery capacity is obtained and superior cycle characteristics are obtained. It is to be noted that, as a cathode material, a material other than the foregoing materials may be used.

$$LiNi_{1-x}M_xO_2 \qquad (4)$$

In the formula, M is one or more types of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb. x is in the range of 0.005<x<0.5.

In addition, the cathode material may be, for example, an oxide, a disulfide, a chalcogenide, a conductive polymer, or the like. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene.

The cathode binder contains, for example, one type, or two or more types of synthetic rubbers, polymer materials, and the like. Examples of the synthetic rubber include styrene butadiene-based rubber, fluorine-based rubber, and ethylene propylene diene. Examples of the polymer material include polyvinylidene fluoride and polyimide.

The cathode electrical conductor contains, for example, one type, or two or more types of carbon materials and the like. Examples of the carbon materials include graphite, carbon black, acetylene black, and Ketjen black. The cathode electrical conductor may be a metal material, a conductive polymer, or the like as long as the material has the electric conductivity.

[Anode]

In the anode 22, for example, an anode active material layer 22B is provided on a single surface or both surfaces of an anode current collector 22A.

The anode current collector 22A is made of, for example, a conductive material such as copper, nickel, and stainless steel. The surface of the anode current collector 22A is preferably roughened. Thereby, due to what we call anchor effect, adhesion characteristics of the anode active material layer 22B with respect to the anode current collector 22A are improved. In this case, it is enough that the surface of the anode current collector 22A in the region opposed to the anode active material layer 22B is roughened at minimum. Examples of roughening methods include a method of forming fine particles by electrolytic treatment. The electrolytic treatment is a method of providing concavity and convexity by forming fine particles on the surface of the anode current collector 22A by an electrolytic method in an electrolytic bath. A copper foil formed by the electrolytic method is generally called "electrolytic copper foil."

The anode active material layer 22B contains one type, or two or more types of anode materials inserting and extracting lithium ions as an anode active material, and may also contain other material such as an anode binder and an anode electrical conductor as needed. Details of the anode binder and the anode electrical conductor are, for example, respectively similar to those of the cathode binder and the cathode electrical conductor. A chargeable capacity of the anode material is preferably larger than a discharge capacity of the cathode 21 in order to prevent unintentional precipitation of Li metal at the time of charge and discharge.

The anode material is, for example, a carbon material. In the carbon material, crystal structure change at the time of insertion and extraction of lithium ions is extremely small. Therefore, the carbon material provides a high energy density and superior cycle characteristics. Further, the carbon material functions as an anode electrical conductor as well. Examples of the carbon material include graphitizable carbon, non-graphitizable carbon in which the spacing of (002) planes is equal to or greater than 0.37 nm, and graphite in which the spacing of (002) planes is equal to or smaller than 0.34 nm. More specifically, examples of the carbon material include pyrolytic carbons, cokes, glassy carbon fiber, an organic polymer compound fired body, activated carbon, and carbon blacks. Of the foregoing, examples of the cokes include pitch coke, needle coke, and petroleum coke. The organic polymer compound fired body is obtained by firing (carbonizing) a polymer compound such as a phenol resin and a furan resin at appropriate temperature. In addition, the carbon material may be a low crystalline carbon or amorphous carbon heat-treated at temperature equal to or lower than about 1000 deg C. The shape of the carbon material may be any of a fibrous shape, a spherical shape, a granular shape, and a scale-like shape.

Further, the anode material may be, for example, a material (metal-based material) having one type, or two or more types of metal elements and metalloid elements as constituent elements, since a high energy density is thereby obtained. Such a metal-based material may be a simple substance, an alloy, or a compound of the metal elements or the metalloid elements, may be two or more types thereof, or may have one type, or two or more types of phases thereof in part or all thereof "Alloy" includes a material containing one or more types of metal elements and one or more types of metalloid elements, in addition to a material formed of two or more types of metal elements. Further, the alloy may contain a nonmetallic element. The structure thereof includes a solid solution, a eutectic crystal (eutectic mixture), an intermetallic compound, and a structure in which two or more types of thereof coexist.

The foregoing metal element or the foregoing metalloid element is, for example, a metal element or a metalloid element capable of forming an alloy with Li. Specifically, the foregoing metal element or the foregoing metalloid element is, for example, one type, or two or more types of the following elements. That is, the foregoing metal element or the foregoing metalloid element is, for example, one type, or two or more types of Mg, B, Al, Ga, In, Si, Ge, Sn, Pb, Bi, Cd, Ag, Zn, Hf, Zr, Y, Pd, and Pt. Specially, Si or Sn or both are preferably used. Si and Sn have a high ability of inserting and extracting lithium ions, and therefore provide a high energy density.

A material containing Si or Sn or both may be, for example, a simple substance, an alloy, or a compound of Si or Sn; two or more types thereof; or a material having one type, or two or more types of phases thereof in part or all thereof. It is to be noted that the simple substance means a general simple substance (a small amount of impurity may be therein contained), and does not necessarily mean a purity 100% simple substance.

Examples of the alloys of Si include a material containing one type, or two or more types of the following elements as a constituent element other than Si. Such an element other than Si can be Sn, Ni, Cu, Fe, Co, Mn, Zn, In, Ag, Ti, Ge, Bi, Sb, or Cr. Examples of the compounds of Si include a material containing C or O as a constituent element other than Si. For example, the compounds of Si may contain one type, or two or more types of the elements described for the alloys of Si as a constituent element other than Si.

Examples of the alloys or the compounds of Si include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0<v≤2), and LiSiO. v in $SiO_v$ may be in the range of 0.2<v<1.4.

Examples of the alloys of Sn include a material containing one type, or two or more types of the following elements as a constituent element other than Sn. Such an element can be Si, Ni, Cu, Fe, Co, Mn, Zn, In, Ag, Ti, Ge, Bi, Sb, or Cr. Examples of the compounds of Sn include a material containing C or O as a constituent element. The compounds of Sn may contain one type, or two or more types of elements described for the alloys of Sn as a constituent element other than Sn. Examples of the alloys or the compounds of Sn include $SnO_w$ (0<w≤2), $SnSiO_3$, LiSnO, and $Mg_2Sn$.

Further, as a material containing Sn, for example, a material containing a second constituent element and a third constituent element in addition to Sn as a first constituent element is preferable. The second constituent element may be, for example, one type, or two or more types of the following elements. That is, the second constituent element may be one type, or two or more types of Co, Fe, Mg, Ti, V, Cr, Mn, Ni, Cu, Zn, Ga, Zr, Nb, Mo, Ag, In, Ce, Hf, Ta, W, Bi, and Si. The third constituent element may be, for example, one type, or two or more types of B, C, Al, and P. In the case where the second constituent element and the third constituent element are contained, a high battery capacity, superior cycle characteristics, and the like are obtained.

Specially, a material containing Sn, Co, and C (SnCoC-containing material) is preferable. The SnCoC-containing material is a material containing, at least, Sn, Co, and C as a constituent element, and may contain other elements as needed as described later. The composition of the SnCoC-containing material is, for example, as follows. That is, the C content is from 9.9 wt % to 29.7 wt % both inclusive, and the ratio of Sn and Co contents (Co/(Sn+Co)) is from 20 wt % to 70 wt % both inclusive, since a high energy density is obtained in such a composition range.

It is preferable that the SnCoC-containing material have a phase containing Sn, Co, and C. Such a phase preferably has a low crystalline structure or an amorphous structure. The phase is a reaction phase capable of reacting with Li. Due to existence of the reaction phase, superior characteristics are obtained. The half bandwidth of the diffraction peak obtained by X-ray diffraction of the phase is preferably equal to or greater than 1.0 deg based on diffraction angle of 2θ in the case where CuKα ray is used as a specific X ray, and the insertion rate is 1 deg/min. Thereby, lithium ions are more smoothly inserted and extracted, and reactivity with the electrolytic solution is decreased. In some cases, the SnCoC-containing material has a phase containing a simple substance of the respective constituent elements or some of the constituent elements in addition to the low crystalline or amorphous phase.

Whether or not the diffraction peak obtained by X-ray diffraction corresponds to the reaction phase capable of reacting with Li is allowed to be easily determined by comparison between X-ray diffraction charts before and after electrochemical reaction with Li. For example, if the position of the diffraction peak after electrochemical reaction with Li is changed from the position of the diffraction peak before the electrochemical reaction with Li, the obtained diffraction peak corresponds to the reaction phase capable of reacting with Li. In this case, for example, the diffraction peak of the low crystalline or amorphous reaction phase is seen in the range of 2θ=from 20 to 50 deg both inclusive. It may be considered that such a reaction phase has, for example, the foregoing respective constituent elements, and the low crystalline or amorphous structure possibly results from existence of C mainly.

In the SnCoC-containing material, part or all of C as a constituent element are preferably bonded with a metal element or a metalloid element as other constituent element, since thereby cohesion or crystallization of Sn or the like is suppressed. The bonding state of elements is allowed to be checked by, for example, X-ray photoelectron spectroscopy (XPS). In a commercially available device, for example, as a soft X ray, Al—Kα ray, Mg—Kα ray, or the like is used. In the case where part or all of C are bonded with a metal element, a metalloid element, or the like, the peak of a synthetic wave of 1s orbit of C (C1s) is shown in a region lower than 284.5 eV. It is to be noted that, in the device, energy calibration is made so that the peak of 4f orbit of Au atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of C in the SnCoC-containing material. Therefore, for example, analysis is made by using commercially available software to isolate both peaks from each other. In the waveform analysis, the position of a main peak existing on the lowest bound energy side is the energy standard (284.8 eV).

The SnCoC-containing material may further contain other constituent elements as needed. Examples of other constituent elements include one type, or two or more types of Si, Fe, Ni, Cr, In, Nb, Ge, Ti, Mo, Al, P, Ga, and Bi.

In addition to the SnCoC-containing material, a material containing Sn, Co, Fe, and C (SnCoFeC-containing material) as constituent elements is also preferable. The composition of the SnCoFeC-containing material may be freely set. For example, a composition in which the Fe content is set small is as follows. That is, the C content is from 9.9 wt % to 29.7 wt % both inclusive, the Fe content is from 0.3 wt % to 5.9 wt % both inclusive, and the ratio of contents of Sn and Co (Co/(Sn+Co)) is from 30 wt % to 70 wt % both inclusive. Further, for example, a composition in which the Fe content is set large is as follows. That is, the C content is from 11.9 wt % to 29.7 wt % both inclusive, the ratio of contents of Sn, Co, and Fe ((Co+Fe)/(Sn+Co+Fe)) is from 26.4 wt % to 48.5 wt % both inclusive, and the ratio of contents of Co and Fe (Co/(Co+Fe)) is from 9.9 wt % to 79.5 wt % both inclusive. In such a composition range, a high energy density is obtained. The physical properties (half bandwidth and the like) of the SnCoFeC-containing material are similar to those of the foregoing SnCoC-containing material.

Further, as other anode material, for example, a metal oxide, a polymer compound, or the like may be used. Examples of the metal oxide include iron oxide, ruthenium oxide, and molybdenum oxide. Examples of the polymer compound include polyacetylene, polyaniline, and polypyrrole.

The anode active material layer 22B is formed by, for example, a coating method, a vapor-phase deposition method, a liquid-phase deposition method, a spraying method, a firing method (sintering method), or a combination of two or more types of these methods. The coating method is a method in which, for example, after a powder (particulate) anode active material is mixed with a binder or the like, the mixture is dispersed in a solvent such as an organic solvent, and the anode current collector is coated with the resultant. Examples of the vapor-phase deposition method include a physical deposition method and a chemical deposition method. Specifically, examples thereof include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method include an electrolytic plating method and an electroless plating method. The spraying method is a method in which an anode active material is sprayed in a fused state or a semi-fused state. The firing method is, for example, a method in which after the anode current collector is coated by a procedure similar to that of the coating method, heat treatment is performed at temperature higher than the melting point of the binder or the like. Examples of the firing method include a known technique such as an atmosphere firing method, a reactive firing method, and a hot press firing method.

[Separator]

The separator 23 separates the cathode 21 from the anode 22, and passes lithium ions while preventing current short circuit resulting from contact of both electrodes. The separator 23 is impregnated with a liquid electrolyte (electrolytic solution). The separator 23 is formed of, for example, a porous film made of a synthetic resin, ceramics, or the like. The separator 23 may be a laminated film in which two or more types of porous films are layered. Examples of the synthetic resin include polytetrafluoroethylene, polypropylene, and polyethylene.

Figure 3:
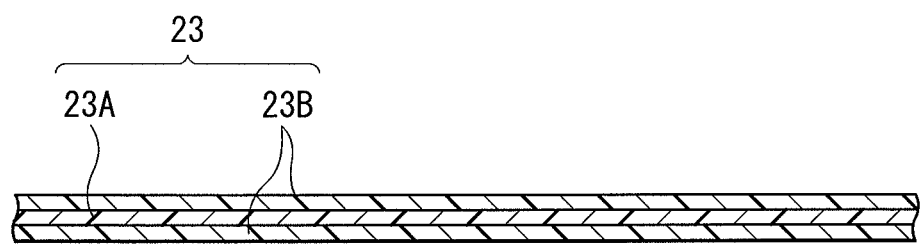
FIG. 3 is a cross-sectional view illustrating a configuration of a separator.

In particular, the structure of the separator 23 is not limited to a single layer structure, and may be a multilayer structure described below. FIG. 3 illustrates a cross-sectional configuration of the separator 23, which corresponds to FIG. 2. For example, as illustrated in FIG. 3, the separator 23 having the multilayer structure preferably has a base material layer 23A composed of the foregoing porous film and a polymer compound layer 23B provided on one surface or the other surface or both of the base material layer 23A. Thereby, adhesion characteristics of the separator 23 with respect to the cathode 21 and the anode 22 are improved, skewness of the spirally wound electrode body 20 is suppressed, and accordingly a decomposition reaction of the electrolytic solution is more suppressed. Further, thereby liquid leakage of the electrolytic solution with which the base material layer 23A is impregnated is suppressed. Thereby, even if charge and discharge are repeated, resistance of the secondary battery is less likely to be increased, and battery swollenness is suppressed.

The polymer compound layer 23B contains, for example, a polymer material such as polyvinylidene fluoride, since such a polymer material has superior physical strength and are electrochemically stable. However, the polymer material may be a material other than polyvinylidene fluoride. The polymer compound layer 23B is formed as follows. That is, after a solution in which the polymer material is dissolved is prepared, the surface of the base material layer 23A is coated with the solution or the base material layer 23A is soaked in the solution, and the resultant is subsequently dried.

[Electrolytic Solution]

The electrolytic solution contains a solvent and an electrolyte salt. The electrolytic solution may contain other materials such as various additives as needed.

[Solvent]

The solvent contains one type, or two or more types of nonaqueous solvents such as the following organic solvents. Examples of the organic solvents include ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, and tetrahydrofuran. Further examples thereof include 2-methyltetrahydrofuran, tetrahydropyran, 1,3-dioxolane, 4-methyl-1,3-dioxolane, 1,3-dioxane, and 1,4-dioxane. Furthermore, examples thereof include methyl acetate, ethyl acetate, methyl propionate, ethyl propionate, methyl butyrate, methyl isobutyrate, trimethyl methyl acetate, and trimethyl ethyl acetate. Furthermore, examples thereof include acetonitrile, glutaronitrile, adiponitrile, methoxyacetonitrile, 3-methoxypropionitrile, N,N-dimethylformamide, N-methylpyrrolidinone, and N-methyloxazolidinone. Furthermore, examples thereof include N,N'-dimethylimidazolidinone, nitromethane, nitroethane, sulfolane, trimethyl phosphate, and dimethyl sulfoxide. By using such a nonaqueous solvent, superior battery capacity, superior cycle characteristics, superior conservation characteristics, and the like are obtained.

Specially, one or more types of ethylene carbonate, propylene carbonate, dimethyl carbonate, diethyl carbonate, and ethyl methyl carbonate are preferable, since thereby more superior characteristics are obtained. In this case, a combination of a high viscosity (high dielectric constant) solvent (for example, specific dielectric constant ε≥30) such as ethylene carbonate as a cyclic ester carbonate and a low viscosity solvent (for example, viscosity≤1 mPa·s) such as dimethyl carbonate as a chain ester carbonate is more preferable. Thereby, dissociation property of the electrolyte salt and ion mobility are improved.

In particular, the solvent preferably contains an unsaturated carbon bond cyclic ester carbonate represented by the following Formula (2) or a halogenated cyclic ester carbonate represented by the following Formula (3) or both.

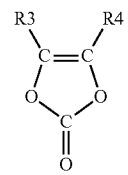

(2)

In the formula, each of R3 and R4 is a hydrogen group or an alkyl group.

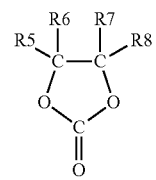

(3)

In the formula, each of R5 to R8 is a hydrogen group, a halogen group, an alkyl group, a vinyl group, a halogenated alkyl group, or a halogenated vinyl group. One or more of R5 to R8 are the halogen group, the halogenated alkyl group, or the halogenated vinyl group.

The unsaturated carbon bond cyclic ester carbonate is a cyclic ester carbonate having one, or two or more unsaturated carbon bonds (carbon-carbon double bond). The solvent contains the unsaturated carbon bond cyclic ester carbonate for the following reason. That is, in this case, since a stable protective film is formed on the surface of the anode 22 at the time of charge and discharge, a decomposition reaction of the electrolytic solution is suppressed. Thereby, even if charge and discharge are repeated, a resistance of the anode 22 is further less likely to be increased.

Each of R3 and R4 in Formula (2) is the hydrogen group or the alkyl group. R3 and R4 may be the same type of group, or may be different types of group from each other. The alkyl group may be in a state of straight chain or may be branched. Though the carbon number of the alkyl group is not particularly limited, specially, the carbon number of the alkyl group is preferably equal to or less than 4. That is, the alkyl group is preferably a methyl group, an ethyl group, a propyl group, or a butyl group, since thereby superior solubility, superior compatibility, and the like are obtained.

Specific examples of the unsaturated carbon bond cyclic ester carbonate include vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. One thereof may be used singly, or two or more types thereof may be used by mixture. Specially, vinylene carbonate is preferable, since vinylene carbonate is easily available and provides high effect. However, as long as the conditions of the chemical formula shown in Formula (2) are satisfied, other compounds may be used. The content of the unsaturated carbon bond cyclic ester carbonate in the solvent is not particularly limited. However, for example, the content thereof is from 0.01 wt % to 30 wt % both inclusive, and is preferably from 0.5 wt % to 10 wt % both inclusive, since thereby a decomposition reaction of the electrolytic solution is suppressed while a battery capacity or the like is not excessively lowered.

The halogenated cyclic ester carbonate is a cyclic ester carbonate having one, or two or more halogens as constituent elements. The solvent contains the halogenated cyclic ester carbonate for the following reason. That is, in this case, since a stable protective film is formed on the surface of the anode 22 at the time of charge and discharge, a decomposition reaction of the electrolytic solution is suppressed. Thereby, even if charge and discharge are repeated, a resistance of the anode 22 is further less likely to be increased. Though the halogen type is not particularly limited, specially, F, Cl, or Br is preferable, and F is more preferable, since thereby higher effect is obtained. The number of halogens is more preferably two than one, and further may be three or more, since thereby a more rigid and stable protective film is formed.

Each of R5 to R8 in Formula (3) is a hydrogen group, a halogen group, an alkyl group, a vinyl group, a halogenated alkyl group, or a halogenated vinyl group. R5 to R8 may be the same type of group, or may be different types of group from each other. The alkyl group and the halogenated alkyl group may be in a state of straight chain or may be branched. One or more of R5 to R8 are the halogen group, the halogenated alkyl group, or the halogenated vinyl group. The halogenated alkyl group is a group obtained by substituting part or all of hydrogen groups of an alkyl group by a halogen group. The halogenated vinyl group is a group obtained by a manner similar to that of the halogenated alkyl group. The carbon number of the alkyl group, the vinyl group, the halogenated alkyl group, or the halogenated vinyl group is similar to that of R3 and R4 in Formula (2).

Specific examples of the halogenated cyclic ester carbonate include 4-fluoro-1,3-dioxolane-2-one, 4-chloro-1,3-dioxolane-2-one, 4,5-difluoro-1,3-dioxolane-2-one, tetrafluoro-1,3-dioxolane-2-one, 4-chloro-5-fluoro-1,3-dioxolane-2-one, 4,5-dichloro-1,3-oxolane-2-one, tetrachloro-1,3-dioxolane-2-one, 4,5-bistrifluoromethyl-1,3-dioxolane-2-one, 4-trifluoromethyl-1,3-dioxolane-2-one, 4,5-difluoro-4,5-dimethyl-1,3-dioxolane-2-one, 4,4-difluoro-5-methyl-1,3-dioxolane-2-one, 4-ethyl-5,5-difluoro-1,3-dioxolane-2-one, 4-fluoro-5-trifluoromethyl-1,3-dioxolane-2-one, 4-methyl-5-trifluoromethyl-1,3-dioxolane-2-one, 4-fluoro-4,5-dimethyl-1,3-dioxolane-2-one, 5-(1,1-difluoroethyl)-4,4-difluoro-1,3-dioxolane-2-one, 4,5-dichloro-4,5-dimethyl-1,3-dioxolane-2-one, 4-ethyl-5-fluoro-1,3-dioxolane-2-one, 4-ethyl-4,5-difluoro-1,3-dioxolane-2-one, 4-ethyl-4,5,5-trifluoro-1,3-dioxolane-2-one, and 4-fluoro-4-methyl-1,3-dioxolane-2-one. One thereof may be used singly, or two or more types thereof may be used by mixture. Specially, 4-fluoro-1,3-dioxolane-2-one or 4,5-difluoro-1,3-dioxolane-2-one is preferable, since 4-fluoro-1,3-dioxolane-2-one or 4,5-difluoro-1,3-dioxolane-2-one is easily available and provides high effect. However, as long as the conditions of the chemical formula shown in Formula (3) are satisfied, other compound may be used. The content of the halogenated cyclic ester carbonate in the solvent is not particularly limited. However, for example, the content thereof is from 0.01 wt % to 30 wt % both inclusive, and is preferably from 0.5 wt % to 10 wt % both inclusive, since thereby a decomposition reaction of the electrolytic solution is suppressed while a battery capacity or the like is not excessively lowered.

In the case where the solvent contains both the unsaturated carbon bond cyclic ester carbonate and the halogenated cyclic ester carbonate, the total of both contents in the solvent is preferably from 0.01 wt % to 30 wt % both inclusive, and is more preferably from 0.5 wt % to 10 wt % both inclusive.

In addition, the solvent may contain a halogenated chain ester carbonate. Thereby, a protective film is formed on the surface of the anode 22 at the time of charge and discharge, and thereby a decomposition reaction of the electrolytic solution is suppressed as in the halogenated cyclic ester carbonate. The halogenated chain ester carbonate is a chain ester carbonate having one, or two or more halogens as constituent elements. Types and the number of the halogens are similar to those of the halogenated cyclic ester carbonate. Specific examples of the halogenated chain ester carbonate include fluoromethyl methyl carbonate, bis (fluoromethyl) carbonate, and difluoromethyl methyl carbonate. One thereof may be used singly, or two or more thereof may be used by mixture. The content of the halogenated chain ester carbonate in the solvent is not particularly limited. However, for example, the content thereof is from 0.01 wt % to 30 wt % both inclusive, since thereby a decomposition reaction of the electrolytic solution is suppressed while a battery capacity or the like is not excessively lowered.

Further, the solvent may contain sultone (cyclic sulfonic ester), since thereby chemical stability of the electrolytic solution is improved. Examples of the sultone include propane sultone and propene sultone. The sultone content in the nonaqueous solvent is, for example, from 0.5 wt % to 5 wt % both inclusive, since thereby a decomposition reaction of the electrolytic solution is suppressed while a battery capacity or the like is not excessively lowered.

Further, the solvent may contain an acid anhydride, since chemical stability of the electrolytic solution is thereby further improved. Examples of the acid anhydride include a dicarboxylic anhydride, a disulfonic anhydride, and a carboxylic sulfonic anhydride. Examples of the dicarboxylic anhydride include succinic anhydride, glutaric anhydride, and maleic anhydride. Examples of the disulfonic anhydride include anhydrous ethane disulfonic acid and anhydrous propane disulfonic acid. Examples of the carboxylic sulfonic anhydride include anhydrous sulfobenzoic acid, anhydrous sulfopropionate, and anhydrous sulfobutyrate. The content of the acid anhydride in the nonaqueous solvent is, for example, from 0.5 wt % to 5 wt % both inclusive since thereby a decomposition reaction of the electrolytic solution is suppressed while a battery capacity or the like is not excessively lowered.

[Electrolyte Salt]

The electrolyte salt contains, for example, one type, or two or more types of lithium salts described below. Examples of the lithium salt include $LiPF_6$, $LiBF_4$, $LiClO_4$, $LiAsF_6$, $LiB(C_6H_5)_4$, $LiCH_3SO_3$, $LiCF_3SO_3$, $LiAlCl_4$, $Li_2SiF_6$, LiCl, and LiBr. Thereby, superior battery capacity, superior cycle characteristics, superior conservation characteristics, and the like are obtained. Specially, one or more types of $LiPF_6$, $LiBF_4$, $LiClO_4$, and $LiAsF_6$ are preferable, and $LiPF_6$ is more preferable, since thereby internal resistance is lowered, and higher effects are obtained. However, the electrolyte salt may be a salt other than the lithium salt (for example, a light metal salt other than the lithium salt).

The content of the electrolyte salt is preferably from 0.3 mol/kg to 3.0 mol/kg both inclusive with respect to the solvent, since thereby high ion conductivity is obtained.

[Metal Salt]

In the secondary battery, the anode 22 or the electrolytic solution or both contain one type, or two or more types of metal salts having an unsaturated carbon bond (hereinafter simply referred to as "metal salt" as well), since thereby an SEI (solid electrolyte interface) film formed on the surface of the anode 22 mainly at the time of the first charge and discharge becomes stable. Thereby, a decomposition reaction of the electrolytic solution is suppressed from the time of the initial charge and discharge, and lowering of the battery capacity is suppressed. In addition, resistance rise of the anode 22 is suppressed, and lowering of ion conductivity is suppressed.

The metal salt is a chain metal compound or a cyclic metal compound having a carbon-carbon double bond (>C=C<) or a carbon-carbon triple bond (—C≡C—) or both as an unsaturated carbon bond (carbon-carbon multiple bond). The number of carbon-carbon double bonds may be one, or two or more, and the number of carbon-carbon triple bonds may be one, or two or more. In the case where one or more carbon-carbon double bonds and one or more carbon-carbon triple bonds are included, the sequence order thereof may be freely set. The metal salt has the unsaturated carbon bond for the following reason. That is, both resistance rise of the anode 22 and a decomposition reaction of the electrolytic solution are suppressed more than in a case that the unsaturated bond is not included.

That is, the metal salt is a salt formed of a carbon anion having one, or two or more unsaturated carbon bonds and one, or two or more metal elements (metal cations). Specific examples of the carbon anion include an acetylide group (—C≡C—), an ethynyl group (HC≡C—), a vinylidene group (—HC=C<), a vinylene group (—HC=CH—), a vinyl group ($H_2C$=CH—), a phenyl group ($C_6H_5$—), and a cyclopentadienyl group ($C_5H_5$—). Metal salts having the foregoing carbon anions are respectively metal acetylide, metal vinylidene, metal vinylene, metal vinyl, metal phenyl, metal cyclopentadiene, and the like. Of the foregoing, the metal acetylide, the metal vinylidene, the metal vinylene, or the metal vinyl is a chain metal salt, and the metal phenyl or the metal cyclopentadiene is a cyclic metal salt. However, a carbon anion other than the foregoing examples may be used as long as one, or two or more unsaturated carbon bonds are therein included.

The metal salt may have one metal element, may have two or more metal elements, or may have two or more types of metal elements. As an example, in the case of the metal acetylide, the metal acetylide may be mono-metal acetylide having one metal element or di-metal acetylide having two metal elements.

More specifically, the metal salt is, for example, a chain metal compound or a cyclic metal compound containing a structure (carbon chain having an unsaturated carbon bond) represented by the following Formula (1).

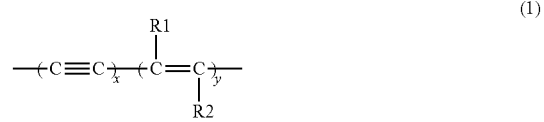

(1)

In the formula, each of R1 and R2 is a hydrogen group, a halogen group, an alkyl group, a derivative of the alkyl group, or a metal element belonging to Group 1 to Group 15 in the long period periodic table. Each of x and y is an integer number equal to or greater than 0. x+y≥1 is satisfied.

R1 and R2 in Formula (1) may be the same type of group, or may be different types of group from each other. Though the carbon numbers of the alkyl group and the derivative thereof are not particularly limited, specially, the carbon numbers of the alkyl group and the derivative thereof are preferably equal to or less than 4 since thereby superior solubility, superior compatibility, and the like are obtained. The derivative of the alkyl group is obtained by introducing one, or two or more substituent groups such as a halogen group and a silyl group into the alkyl group.

The chain metal salt may have a metal element at one end or both ends of the structure (carbon chain having an unsaturated carbon bond) shown in Formula (1), or may have a metal element in R1 (or R2) instead of at both ends thereof, or may have a metal element at one end or both ends thereof and in R1 (or R2). The metal salt may have a hydrogen group, a silyl group, a trialkylsilyl group, or the like at an end not having the metal element. Meanwhile, in the cyclic metal salt, ends of a carbon chain having the unsaturated carbon bond shown in Formula (1) are bonded with each other, and a metal element is contained in part of the ring thereof. Each of x and y representing the number of unsaturated carbon bonds is an integer number equal to or larger than 0, and x+y≥1 is satisfied. That is, the metal salt surely has a carbon-carbon double bond or a carbon-carbon triple bond or both.

Metal element types are not particularly limited as long as the metal element is one or more types of metal elements belonging to Group 1 to Group 15 in the long period periodic table. Specially, the metal element types are preferably an alkali metal element or an alkali earth metal element or both, since thereby higher effect is obtained. Further, in this case, synthesizing the metal salt and the like are easily performed, and superior solubility, superior compatibility, and the like are obtained. Examples of the alkali metal element include Li, Na, K, Rb, and Cs. Examples of the alkali earth metal element include Be, Mg, Ca, Sr, and Ba. Therefore, the metal salt is preferably the alkali metal salt or the alkali earth metal salt or both.

Specific examples of the metal salt are as follows. Examples of the metal acetylide include dilithium acetylide, lithium acetylide, lithium trimethyl silyl acetylide, and ethynyl magnesium chloride. Examples of the metal vinylidene include vinylidene dilithium (1,1-dilithium ethene). Examples of the metal vinylene include vinylene dilithium (1,2-dilithium ethene). Examples of the metal vinyl include vinyl lithium and vinyl magnesium chloride. Examples of the metal phenyl include phenyl lithium. Examples of the metal cyclopentadiene include cyclopentadienyl lithium.

Figure 4:
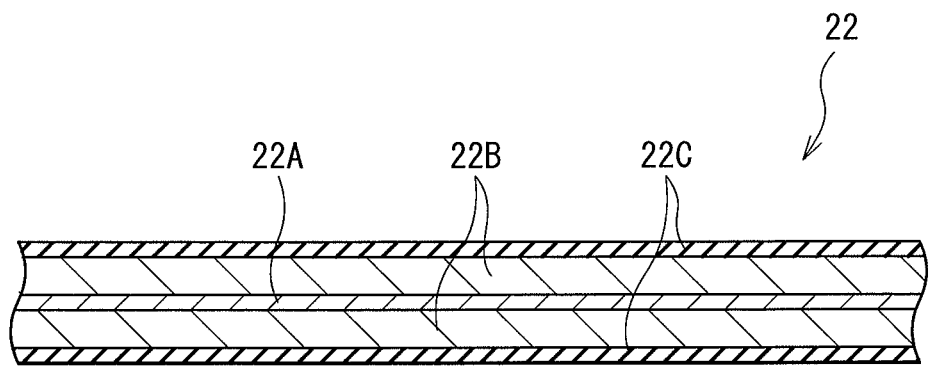
FIG. 4 is a cross-sectional view illustrating a configuration of an anode.

In the case where the anode 22 contains the metal salt, for example, as illustrated in FIG. 4 corresponding to FIG. 2, the metal salt is contained in a coating layer 22C. The coating layer 22C is formed to cover part or all of the surface of the anode active material layer 22B, and contains the metal salt. Due to existence of the coating layer 22C, even if charge and discharge are repeated, a decomposition reaction of the electrolytic solution is suppressed while resistance rise of the anode 22 is suppressed.

In forming the coating layer 22C, for example, after a solution obtained by dispersing the metal salt in an arbitrary dispersion solvent is prepared, the surface of the anode active material layer 22B is coated with the solution, and the resultant is subsequently dried. Otherwise, after the anode active material layer 22B is soaked in the solution, the anode active material layer 22B is taken out from the solution and is dried. In either method, the coating layer 22C containing the metal salt is formed on the surface of the anode active material layer 22B. The formation amount of the coating layer 22C is freely set, and is adjustable according to a coating amount of the solution, time duration of soaking in the solution, and the like.

Alternately, instead of forming the coating layer 22C containing the metal salt, the metal salt may be contained in the anode active material layer 22B by being mixed with an anode active material and the like at the time of preparing an anode mixture, for example. In this case, a decomposition reaction of the electrolytic solution is suppressed while resistance rise of the anode 22 is suppressed. It is needless to say that the coating layer 22C containing the metal salt may be formed after the metal salt is contained in the anode active material layer 22B.

Meanwhile, in the case where the electrolytic solution contains the metal salt, the metal salt is mixed with the solvent, the electrolyte salt, and the like at the time of preparing the electrolytic solution. Thereby, the metal salt is contained in the electrolytic solution. In the case where the electrolytic solution in contact with the anode 22 contains the metal salt, a coat containing the metal salt is formed on the surface of the anode 22 at the time of charge and discharge. Therefore, functions similar to those of the case that the coating layer 22C containing the metal salt is formed are obtained.

Though the metal salt content in the electrolytic solution is not particularly limited, in particular, the metal salt content in the electrolytic solution is preferably from 0.01 wt % to 0.5 wt % both inclusive, since thereby higher effects are obtained.

The anode 22 or the electrolytic solution or both contain the metal salt. That is, both the anode 22 and the electrolytic solution may contain the metal salt, or only one thereof may contain the metal salt. In either case, a decomposition reaction of the electrolytic solution is suppressed while resistance rise of the anode 22 is suppressed. Specially, both the anode 22 and the electrolytic solution preferably contain the metal salt for the following reason. That is, in the case where only the anode 22 contains the metal salt, due to repeated charge and discharge, the coating layer 22C itself is gradually decomposed, and therefore the function of suppressing decomposition of the electrolytic solution is possibly lowered gradually. Meanwhile, in the case where both the anode 22 and the electrolytic solution contain the metal salt, even if the coating layer 22C itself is gradually decomposed, the coating layer 22C is formed supplementarily by the metal salt contained in the electrolytic solution and therefore the function of suppressing decomposition of the electrolytic solution is easily sustained.

Whether or not the coat (or the coating layer 22C) containing the metal salt exists on the surface of the anode active material layer 22B is allowed to be checked by an existing elemental analysis method. Specifically, for example, after the secondary battery is disassembled and the anode 22 is taken out, the surface of the anode 22 is analyzed by energy dispersive X-ray spectroscopy (SEM-EDX), time-of flight secondary ion mass spectrometry (TOF-SIMS), or the like. In this case, in order to prevent unnecessary components in the electrolytic solution from being analyzed unintentionally, it is preferable that the surface of the anode 22 be washed with an organic solvent such as dimethyl carbonate and the resultant be subsequently analyzed.

[Operation of Secondary Battery]

In the secondary battery, for example, at the time of charge, lithium ions extracted from the cathode 21 are inserted in the anode 22 through the electrolytic solution, and at the time of discharge, lithium ions extracted from the anode 22 are inserted in the cathode 21 through the electrolytic solution.

[Method of Manufacturing Secondary Battery]

The secondary battery is manufactured, for example, by the following procedure.

In forming the cathode 21, a cathode active material is mixed with a cathode binder, a cathode electrical conductor, or the like as needed to prepare a cathode mixture. Subsequently, the cathode mixture is dispersed in an organic solvent or the like to obtain a paste cathode mixture slurry. Subsequently, both surfaces of the cathode current collector 21A are coated with the cathode mixture slurry, which is dried to form the cathode active material layer 21B. Subsequently, the cathode active material layer 21B is compression-molded by a rolling press machine or the like while being heated as needed. In this case, compression-molding may be repeated several times.

In forming the anode 22, a procedure similar to that of the foregoing cathode 21 is used. Specifically, an anode active material is mixed with an anode binder, an anode electrical conductor, or the like as needed to prepare an anode mixture, which is subsequently dispersed in an organic solvent or the like to form a paste anode mixture slurry. Subsequently, both surfaces of the anode current collector 22A are coated with the anode mixture slurry, which is dried to form the anode active material layer 22B. After that, the anode active material layer 22B is compression-molded as needed. The anode active material layer 22B may be formed by depositing an anode material on both surfaces of the anode current collector 22A by using a vapor-phase deposition method such as an evaporation method. In forming the anode 22, the metal salt is contained in the anode active material layer 22B, or the coating layer 22C containing the metal salt is formed on the surface of the anode active material layer 22B as needed.

In preparing the electrolytic solution, after an electrolyte salt is dissolved in a solvent, the metal salt is added to the resultant as needed.

In assembling the secondary battery, the cathode lead 25 is attached to the cathode current collector 21A by a welding method or the like, and the anode lead 26 is attached to the anode current collector 22A by a welding method or the like. Subsequently, the cathode 21 and the anode 22 are layered with the separator 23 in between and are spirally wound, and thereby the spirally wound electrode body 20 is formed. After that, the center pin 24 is inserted in the center of the spirally wound electrode body 20. As the separator 23, a porous film may be directly used, or a matter in which the polymer compound layer 23B is formed on the surface of the base material layer 23A as a porous film may be used. Subsequently, the spirally wound electrode body 20 is sandwiched between the pair of insulating plates 12 and 13, and is contained in the battery can 11. In this case, the end tip of the cathode lead 25 is attached to the safety valve mechanism 15 by a welding method or the like, and the end tip of the anode lead 26 is attached to the battery can 11 by a welding method or the like. Subsequently, the electrolytic solution is injected into the battery can 11, and the separator 23 is impregnated with the electrolytic solution. Subsequently, at the open end of the battery can 11, the battery cover 14, the safety valve mechanism 15, and the PTC device 16 are fixed by being swaged with the gasket 17.

[Function and Effect of Secondary Battery]

According to the cylindrical type secondary battery, the anode 22 or the electrolytic solution or both contain the metal salt having the unsaturated carbon bond. Thus, as described above, the coating (or the coating layer 22C) is formed on the surface of the anode 22 due to charge and discharge. Therefore, even if charge and discharge are repeated, a decomposition reaction of the electrolytic solution is suppressed while resistance rise of the anode 22 is suppressed,. Accordingly, battery characteristics such as battery capacity characteristics, cycle characteristics, and swollenness characteristics are allowed to be improved.

In particular, in the case where the metal salt is the chain metal compound or the cyclic metal compound containing the structure shown in Formula (1), or more specifically, in the case where the metal salt is metal acetylide, metal vinylidene, metal vinylene, metal vinyl, metal phenyl, or metal cyclopentadiene, higher effects are allowed to be obtained.

Further, in the case where the electrolytic solution contains the metal salt, and the content of the metal salt in the electrolytic solution is from 0.01 wt % to 0.5 wt % both inclusive, higher effects are allowed to be obtained.

Further, in the case where the solvent of the electrolytic solution contains the unsaturated carbon bond cyclic ester carbonate or the halogenated cyclic ester carbonate or both, higher effects are allowed to be obtained.

Further, in the case where the separator 23 contains the polymer compound layer 23B on the surface of the base material layer 23A as a porous film, higher effects are allowed to be obtained.

[1-2. Laminated Film Type]

Figure 5:
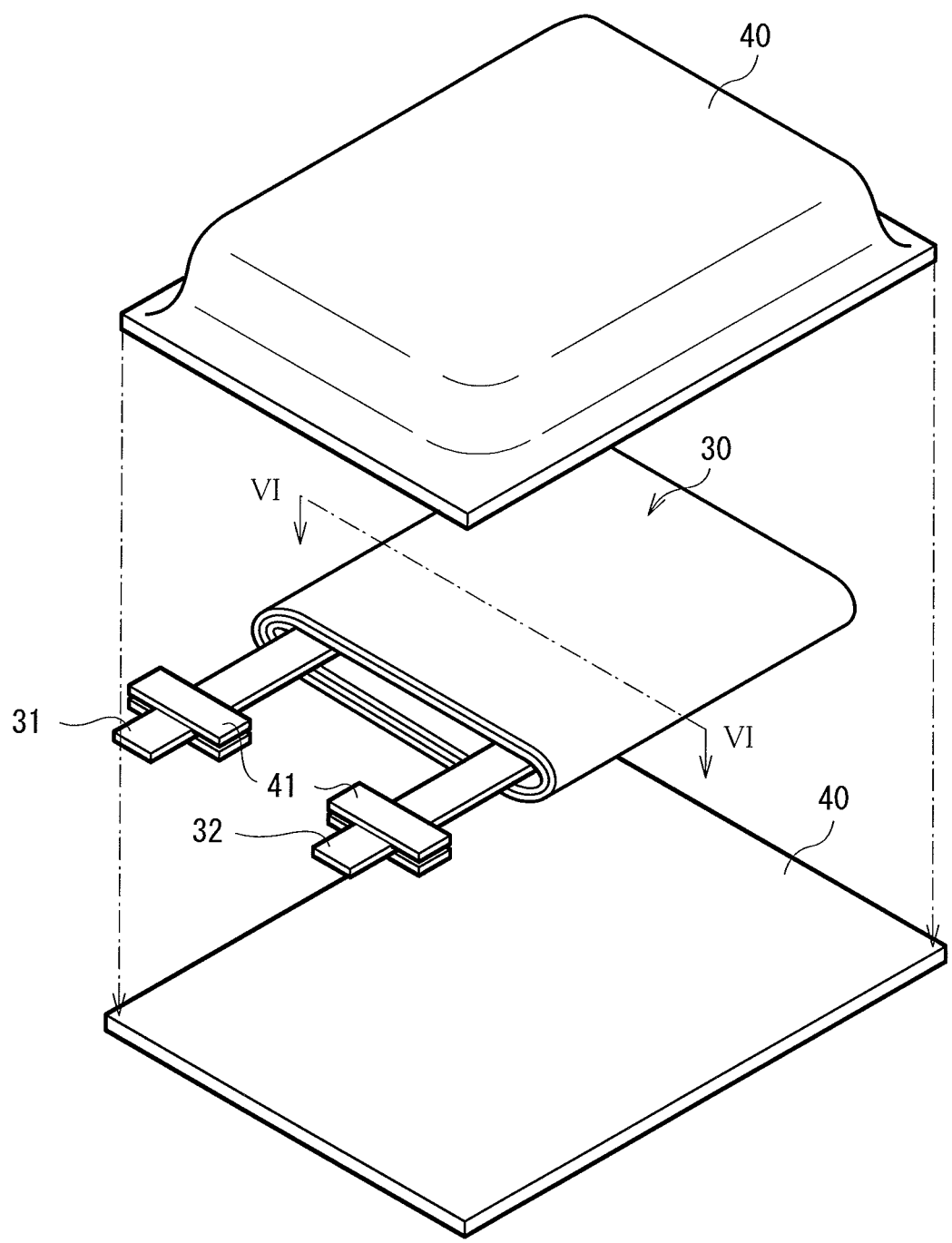
FIG. 5 is a perspective view illustrating a configuration of another secondary battery (laminated film type) according to an embodiment of the present application.
Figure 6:
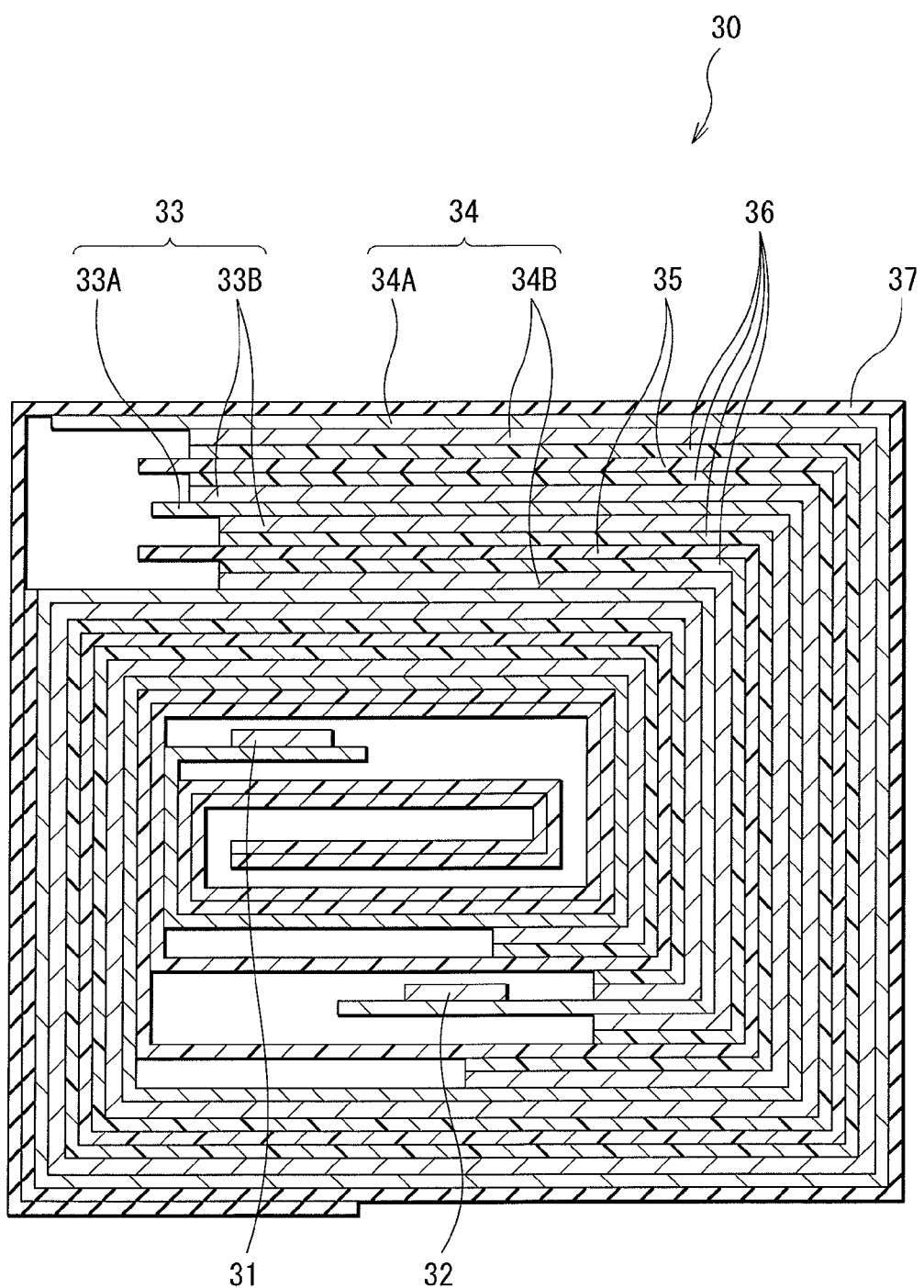
FIG. 6 is a cross-sectional view taken along a line VI-VI of a spirally wound electrode body illustrated in FIG. 5.

FIG. 5 illustrates an exploded perspective configuration of another secondary battery according to an embodiment of the present application. FIG. 6 illustrates an enlarged cross-section taken along a line VI-VI of a spirally wound electrode body 30 illustrated in FIG. 5. In the following description, the elements of the cylindrical type secondary battery described above will be used as needed.

[Whole Structure of Secondary Battery]

The secondary battery herein described is, for example, what we call a laminated film type lithium ion secondary battery. In the secondary battery, the spirally wound electrode body 30 is contained in a film outer package member 40. In the spirally wound electrode body 30, a cathode 33 and an anode 34 are layered with a separator 35 and an electrolyte layer 36 in between and are spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 are, for example, led out from inside to outside of the outer package member 40 in the same direction. The cathode lead 31 is made of, for example, a conductive material such as aluminum, and the anode lead 32 is made of, for example, a conducive material such as copper, nickel, and stainless steel. These materials are in the shape of, for example, a thin plate or mesh.

The outer package member 40 is a laminated film in which, for example, a fusion bonding layer, a metal layer, and a surface protective layer are layered in this order. In the laminated film, for example, the respective outer edges of the fusion bonding layer of two films are bonded with each other by fusion bonding, an adhesive, or the like so that the fusion bonding layer and the spirally wound electrode body 30 are opposed to each other. Examples of the fusion bonding layer include a film made of polyethylene, polypropylene, or the like. Examples of the metal layer include an aluminum foil. Examples of the surface protective layer include a film made of nylon, polyethylene terephthalate, or the like.

Specially, as the outer package member 40, an aluminum laminated film in which a polyethylene film, an aluminum foil, and a nylon film are layered in this order is preferable. However, the outer package member 40 may be made of a laminated film having other laminated structures, a polymer film such as polypropylene, or a metal film.

An adhesive film 41 to protect from outside air intrusion is inserted between the outer package member 40, and the cathode lead 31 and the anode lead 32. The adhesive film 41 is made of a material having adhesion characteristics with respect to the cathode lead 31 and the anode lead 32. Examples of such a material include a polyolefin resin such as polyethylene, polypropylene, modified polyethylene, and modified polypropylene.

In the cathode 33, for example, a cathode active material layer 33B is provided on both surfaces of a cathode current collector 33A. In the anode 34, for example, an anode active material layer 34B is provided on both surfaces of an anode current collector 34A. The configurations of the cathode current collector 33A, the cathode active material layer 33B, the anode current collector 34A, and the anode active material layer 34B are respectively similar to the configurations of the cathode current collector 21A, the cathode active material layer 21B, the anode current collector 22A, and the anode active material layer 22B. Therefore, the metal salt having an unsaturated bond is contained in the anode active material layer 34B, or a coating layer containing the metal salt is formed on the anode active material layer 34B as needed. Further, the configuration of the separator 35 is similar to the configuration of the separator 23.

In the electrolyte layer 36, an electrolytic solution is held by a polymer compound. The electrolyte layer 36 may contain other materials such as an additive as needed. The electrolyte layer 36 is what we call a gel electrolyte, since thereby high ion conductivity (for example, 1 mS/cm or more at room temperature) is obtained and liquid leakage of the electrolytic solution is prevented.

Examples of the polymer compound include one type, or two or more types of the following polymer materials. That is, examples thereof include polyacrylonitrile, polyvinylidene fluoride, polytetrafluoro ethylene, polyhexafluoropropylene, polyethylene oxide, polypropylene oxide, polyphosphazene, polysiloxane, and polyvinyl fluoride. Further, examples thereof include polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Further examples thereof include a copolymer of vinylidene fluoride and hexafluoro propylene. Specially, polyvinylidene fluoride or the copolymer of vinylidene fluoride and hexafluoro propylene is preferable, and polyvinylidene fluoride is more preferable, since such a polymer compound is electrochemically stable. The additive amount of the polymer compound in the electrolytic solution varies according to compatibility between the electrolytic solution and the polymer compound, and is preferably from 0.5 wt % to 50 wt % both inclusive.

The composition of the electrolytic solution is similar to the composition of the cylindrical type secondary battery. Therefore, the electrolytic solution contains the metal salt having an unsaturated bond as needed. However, in the electrolyte layer 36 as a gel electrolyte, a solvent of the electrolytic solution represents a wide concept including not only a liquid solvent but also a material having ion conductivity capable of dissociating the electrolyte salt. Therefore, in the case where the polymer compound having ion conductivity is used, the polymer compound is also included in the solvent.

Instead of the gel electrolyte layer 36, the electrolytic solution may be used as it is. In this case, the separator 35 is impregnated with the electrolytic solution.

[Operation of Secondary Battery]

In the secondary battery, for example, at the time of charge, lithium ions extracted from the cathode 33 are inserted in the anode 34 through the electrolyte layer 36. Meanwhile, at the time of discharge, lithium ions extracted from the anode 34 are inserted in the cathode 53 through the electrolyte layer 36.

[Method of Manufacturing Secondary Battery]

The secondary battery including the gel electrolyte layer 36 is manufactured, for example, by the following three types of procedures.

In the first procedure, the cathode 33 and the anode 34 are formed by a formation procedure similar to that of the cathode 21 and the anode 22. In this case, the cathode 33 is formed by forming the cathode active material layer 33B on both surfaces of the cathode current collector 33A. Further, the anode 34 is formed by forming the anode active material layer 34B on both surfaces of the anode current collector 34A, and subsequently forming a coating layer containing the metal salt having an unsaturated bond as needed. Subsequently, a precursor solution containing, as needed, an electrolytic solution containing the metal salt having an unsaturated bond, a polymer compound, an organic solvent, and the like is prepared. After that, the cathode 33 and the anode 34 are coated with the precursor solution to form the gel electrolyte layer 36. Subsequently, the cathode lead 31 is attached to the cathode current collector 33A by a welding method or the like and the anode lead 32 is attached to the anode current collector 34A by a welding method or the like. Subsequently, the cathode 33 and the anode 34 provided with the electrolyte layer 36 are layered with the separator 35 in between and are spirally wound to form the spirally wound electrode body 30. After that, the protective tape 37 is adhered to the outermost periphery thereof Subsequently, after the spirally wound electrode body 30 is sandwiched between two pieces of film-like outer package members 40, outer edges of the outer package members 40 are bonded by a thermal fusion bonding method or the like to enclose the spirally wound electrode body 30 into the outer package members 40. In this case, the adhesive films 41 are inserted between the cathode lead 31 and the anode lead 32, and the outer package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to form a spirally wound body as a precursor of the spirally wound electrode body 30. After that, the protective tape 37 is adhered to the outermost periphery thereof Subsequently, after the spirally wound body is sandwiched between two pieces of the film-like outer package members 40, the outermost edges except for one side are bonded by a thermal fusion bonding method or the like to obtain a pouched state, and the spirally wound body is contained in the pouch-like outer package member 40. Subsequently, a composition for electrolyte containing an electrolytic solution, a monomer as a raw material for the polymer compound, a polymerization initiator, and other material such as a polymerization inhibitor as needed is prepared, which is injected into the pouch-like outer package member 40. After that, the outer package member 40 is hermetically sealed by a thermal fusion bonding method or the like. Subsequently, the monomer is thermally polymerized. Thereby, a polymer compound is formed, and therefore the gel electrolyte layer 36 is formed.

In the third procedure, the spirally wound body is formed and contained in the pouch-like outer package member 40 in a manner similar to that of the foregoing second procedure, except that the separator 35 with both surfaces coated with a polymer compound is used. Examples of the polymer compound with which the separator 35 is coated include a polymer containing vinylidene fluoride as a component (a homopolymer, a copolymer, a multicomponent copolymer, or the like). Specific examples thereof include polyvinylidene fluoride, a binary copolymer containing vinylidene fluoride and hexafluoro propylene as components, and a ternary copolymer containing vinylidene fluoride, hexafluoro propylene, and chlorotrifluoroethylene as components. In addition to the polymer containing vinylidene fluoride as a component, other one type, or two or more types of polymer compounds may be used. Subsequently, an electrolytic solution is prepared and injected into the outer package member 40. After that, the opening of the outer package member 40 is hermetically sealed by a thermal fusion bonding method or the like. Subsequently, the resultant is heated while a weight is applied to the outer package member 40, and the separator 35 is adhered to the cathode 33 and the anode 34 with the polymer compound in between. Thereby, the polymer compound is impregnated with the electrolytic solution, and accordingly the polymer compound is gelated to form the electrolyte layer 36.

In the third procedure, the swollenness of the secondary battery is suppressed more than in the first procedure.

Further, in the third procedure, the monomer as a raw material of the polymer compound, the solvent, and the like are less likely to be left in the electrolyte layer 36 compared to in the second procedure. Thus, the formation step of the polymer compound is favorably controlled. Therefore, sufficient adhesion characteristics are obtained between the cathode 33, the anode 34, and the separator 35, and the electrolyte layer 36.

[Function and Effect of Secondary Battery]

According to the laminated film type secondary battery, the anode 34 or the electrolytic solution or both contain the metal salt having the unsaturated carbon bond. Thereby, for a reason similar to that of the cylindrical type secondary battery, even if charge and discharge are repeated, a decomposition reaction of the electrolytic solution is suppressed while resistance rise of the anode 22 is suppressed. Therefore, battery characteristics such as battery capacity characteristics, cycle characteristics, and swollenness characteristics are allowed to be improved. In particular, in the laminated film type secondary battery, battery swollenness easily occurs by being influenced by gas generated due to a decomposition reaction of the electrolytic solution. Therefore, such battery swollenness is allowed to be suppressed. Other functions and other effects are similar to those of the cylindrical type secondary battery.

[2. Applications of Secondary Battery]

Next, a description will be given of application examples of the foregoing secondary battery.

Applications of the secondary battery are not particularly limited as long as the secondary battery is used for a machine, a device, an instrument, an apparatus, a system (collective entity of a plurality of devices and the like), or the like that is allowed to use the secondary battery as a drive power source, an electric power storage source for electric power storage, or the like. In the case where the secondary battery is used as a power source, the secondary battery may be used as a main power source (power source used preferentially), or an auxiliary power source (power source used instead of a main power source or used being switched from the main power source). In the latter case, the main power source type is not limited to the secondary battery.

Examples of applications of the secondary battery include electronic devices such as a video camcoder, a digital still camera, a mobile phone, a notebook personal computer, a cordless phone, a headphone stereo, a portable radio, a portable television, and a personal digital assistant (PDA). Examples of the electronic devices include a lifestyle electric appliance such as an electric shaver; a memory device such as a backup power source and a memory card; and a medical electronic device such as a pacemaker and a hearing aid. Examples of applications of the secondary battery further include an electric power tool such as an electric drill and an electric saw; an electrical vehicle such as an electric automobile (including a hybrid car); and an electric power storage system such as a home battery system for storing electric power for emergency or the like.

Specially, the secondary battery is effectively applicable to the electronic device, the electric power tool, the electrical vehicle, the electric power storage system, or the like. In these applications, since superior characteristics of the secondary battery are demanded, the characteristics are allowed to be effectively improved by using the secondary battery according to the embodiment of the present application. The electronic device executes various functions (music replay or the like) by using a secondary battery as a working electric power source. The electric power tool is a tool in which a moving part (for example, a drill or the like) is moved by using a secondary battery as a driving power source. The electrical vehicle is a vehicle that runs by using a secondary battery as a driving power source. As described above, an automobile including a drive source other than a secondary battery (hybrid vehicle or the like) may be included. The electric power storage system is a system using a secondary battery as an electric power storage source. For example, in a home electric power storage system, electric power is stored in the secondary battery as an electric power storage source, and the electric power stored in the secondary battery is consumed as needed. Thereby, various devices such as home electric products become usable.

EXAMPLES

Specific examples of the present application will be described in detail.

Examples 1-1 to 1-6

The laminated film type secondary battery illustrated in FIG. 5 and FIG. 6 was fabricated by the following procedure. After that, various characteristics of the secondary battery were examined, and results illustrated in Table 1 were obtained.

In forming the cathode 33, 94 parts by mass of a cathode active material ($LiCoO_2$), 3 parts by mass of a cathode binder (polyvinylidene fluoride: PVDF), and 3 parts by mass of a cathode electrical conductor (graphite) were mixed to obtain a cathode mixture. Subsequently, the cathode mixture was dispersed in an organic solvent (N-methyl-2-pyrrolidone: NMP) to obtain a cathode mixture slurry. Subsequently, both surfaces of the cathode current collector 33A (aluminum foil, thickness: 10 µm) were coated with the cathode mixture slurry, which was dried to form the cathode active material layer 33B. After that, the cathode active material layer 33B was compression-molded (thickness of a single side: 30 µm, volume density: 3.4 $g/cm^3$). After that, the cathode current collector 33A on which the cathode active material layer 33B was formed was cut in the shape of a strip (50 mm wide, 300 mm long).

In forming the anode 34, 97 parts by mass of an anode active material (mesocarbon microbead as a carbon material) and 3 parts by mass of an anode binder (PVDF) were mixed to obtain an anode mixture. Subsequently, the anode mixture was dispersed in an organic solvent (NMP) to obtain an anode mixture slurry. Subsequently, both surfaces of the anode current collector 34A (copper foil being 10 µm thick) were coated with the anode mixture slurry, which was dried to form the anode active material layer 34B. After that, the anode active material layer 34B was compression-molded (thickness of a single side: 30 µm, volume density: 1.8 $g/cm^3$). After that, the anode current collector 34A on which the anode active material layer 34B was formed was cut in the shape of a strip (50 mm wide, 300 mm long).

In preparing an electrolytic solution, an electrolyte salt ($LiPF_6$) was dissolved in a solvent (ethylene carbonate (EC) and diethyl carbonate (DEC)). After that, as needed, a metal salt was added to the resultant. In this case, the solvent mixture ratio at a weight ratio was EC:DEC=30:70, and the content of the electrolyte salt with respect to the solvent was 1 mol/kg. Dilithium acetylide (DLA) was used as the metal salt, and the concentrations of the metal salt in the electrolytic solution were set as illustrated in Table 1.

In assembling the secondary battery, the cathode lead 31 made of aluminum was welded to one end of the cathode current collector 33A, and the anode lead 32 made of nickel was welded to one end of the anode current collector 34A. Subsequently, the cathode 33, the separator 35, the anode 34, and the separator 35 were layered in this order. As the separator 35, a body in which a polymer compound layer (PVDF being 2 μm thick) was formed on both surfaces of a base material layer (microporous polyethylene film as a porous film being 7 μm) was used. Subsequently, the laminated body was spirally wound in the longitudinal direction to form a spirally wound body being a precursor of the spirally wound electrode body 30. After that, the winding end thereof was fixed by the protective tape 37 (adhesive tape). Subsequently, after the spirally wound body was sandwiched between the outer package members 40, the outermost edges except for one side were bonded by thermal fusion bonding to obtain a pouched state, and the spirally wound body was contained in the pouch-like outer package member 40. As the outer package member 40, an aluminum laminated film in which a nylon film (thickness: 30 μm), an aluminum foil (thickness: 40 μm), and a non-stretched polypropylene film (thickness: 30 μm) were layered from outside was used. Subsequently, 2 g of the electrolytic solution was injected into an opening of the outer package member 40, the separator 35 was impregnated with the electrolytic solution, and thereby the spirally wound electrode body 30 was formed. Finally, the opening of the outer package member 40 was sealed by thermal fusion bonding in the vacuum atmosphere. Thereby, the secondary battery was completed.

In examining battery capacity characteristics, the secondary battery was charged and discharged in the atmosphere at 23 deg C., and the initial discharge capacity (mAh) was measured. At the time of charge and discharge, after constant-current and constant-voltage charge was performed at a current of 1 C until the voltage reached the upper limit voltage of 4.2 V, constant current discharge was performed at a current of 1 C until the voltage reached the final voltage of 3.0 V. "1 C" means a current value at which a theoretical capacity is completely discharged in one hour.

In examining cycle characteristics, the secondary battery that had been charged and discharged for the first time as described above was charged and discharged one cycle and the discharge capacity (mAh) was measured. After that, charge and discharge were repeated until the total number of cycles reached 300, and the discharge capacity (mAh) was measured. From the foregoing result, capacity retention ratio (%)=(discharge capacity at the 300th cycle/discharge capacity at the first cycle)*100 was calculated. Charge and discharge conditions were similar to those in the case of examining the battery capacity characteristics.

In examining swollenness characteristics, after the thickness (mm) of the secondary battery was measured in the atmosphere at 23 deg C., the secondary battery was charged and discharged in the same atmosphere, and the thickness (mm) of the secondary battery was measured again. From the foregoing result, the first swollenness ratio (%)=[(thickness after charge and discharge—thickness before charge and discharge)/thickness before charge and discharge]*100 was calculated. At the time of charge and discharge, after charge was performed for 3 hours at a current of 800 mA until the voltage reached the upper limit voltage of 4.2 V, discharge was performed at a current of 800 mA until the voltage reached the final voltage of 3.0 V.

In examining resistance characteristics, at the time of examining the foregoing cycle characteristics, a resistance of the secondary battery in a charged state that had been subjected to the first cycle charging (1 kHz AC impedance: mΩ) was measured. After the 300th cycle charging, a resistance (mΩ) was measured again. From the foregoing result, resistance change amount (mΩ)=(resistance after the 300th cycle charging)−(resistance after the first cycle charging) was calculated.

TABLE 1

Containing place of the metal salt: electrolytic solution

| Table 1 | Metal salt Type | Content (wt %) | Discharge capacity (mAh) | Capacity retention ratio (%) | Swollenness ratio (%) | Resistance change amount (mΩ) |
|---|---|---|---|---|---|---|
| Example 1-1 | DLA | 0.01 | 805 | 84 | 11.0 | 25 |
| Example 1-2 | | 0.1 | 808 | 83 | 11.1 | 25 |
| Example 1-3 | | 0.5 | 806 | 82 | 11.1 | 26 |
| Example 1-4 | | 1 | 802 | 81 | 11.5 | 27 |
| Example 1-5 | | 2 | 800 | 81 | 11.7 | 27 |
| Example 1-6 | — | — | 799 | 80 | 11.8 | 27 |

In the case where the electrolytic solution contained the metal salt (DLA), compared to the case that the electrolytic solution did not contain the metal salt, a higher discharge capacity and a higher capacity retention ratio were obtained and the swollenness ratio was suppressed while the resistance change amount was equal to or less than that of the case that the electrolytic solution did not contain the metal salt. In particular, in the case where the content of the metal salt in the electrolytic solution was from 0.01 wt % to 0.5 wt % both inclusive, higher effects were obtained.

Examples 2-1 to 2-6

Secondary batteries were fabricated by a procedure similar to that of Examples 1-1 to 1-6, except that 4-fluoro-1,3-dioxolane-2-one (FEC) was added as a solvent. Various characteristics thereof were examined, and results illustrated in Table 2 were obtained. In this case, the FEC content in the solvent was 5 wt %, and part of EC was substituted by FEC.

TABLE 2

Containing place of the metal salt: electrolytic solution

| Table 2 | Metal salt Type | Content (wt %) | Solvent Type | Content (wt %) | Discharge capacity (mAh) | Capacity retention ratio (%) | Swollenness ratio (%) | Resistance change amount (mΩ) |
|---|---|---|---|---|---|---|---|---|
| Example 2-1 | DLA | 0.01 | FEC | 5 | 819 | 84 | 5.0 | 14 |
| Example 2-2 | | 0.1 | | | 824 | 84 | 5.1 | 15 |

TABLE 2-continued

Containing place of the metal salt: electrolytic solution

| Table 2 | Metal salt Type | Content (wt %) | Solvent Type | Content (wt %) | Discharge capacity (mAh) | Capacity retention ratio (%) | Swollenness ratio (%) | Resistance change amount (mΩ) |
|---|---|---|---|---|---|---|---|---|
| Example 2-3 | | 0.5 | | | 828 | 84 | 5.4 | 17 |
| Example 2-4 | | 1 | | | 813 | 83 | 5.7 | 19 |
| Example 2-5 | | 2 | | | 808 | 83 | 5.7 | 20 |
| Example 2-6 | — | — | FEC | 5 | 798 | 82 | 5.8 | 25 |

Even in the case where the solvent composition was changed, results substantially similar to those of Table 1 were obtained. That is, in the case where the electrolytic solution contained the metal salt (DLA), compared to the case that the electrolytic solution did not contain the metal salt, a higher discharge capacity, a higher capacity retention ratio, and a smaller swollenness ratio were obtained, and the resistance change amount was decreased. In particular, in the case where the solvent contained FEC, the discharge capacity and the capacity retention ratio were further increased, and the swollenness ratio was further decreased.

Examples 3-1 to 3-14 and 4-1 to 4-14

Secondary batteries were fabricated by a procedure similar to that of Examples 1-2, 1-3, 2-2, and 2-3, except that the metal salt type was changed. Various characteristics thereof were examined, and results illustrated in Table 3 and Table 4 were obtained. As the metal salt, lithium acetylide (LA), lithium trimethyl silyl acetylide (LSA), ethynyl magnesium chloride (EMC), vinyl lithium (VL), vinyl magnesium chloride (VMC), phenyl lithium (PL), or cyclopentadienyl lithium (CPL) was used.

TABLE 3

Containing place of the metal salt: electrolytic solution

| Table 3 | Metal salt Type | Content (wt %) | Discharge capacity (mAh) | Capacity retention ratio (%) | Swollenness ratio (%) | Resistance change amount (mΩ) |
|---|---|---|---|---|---|---|
| Example 3-1 | LA | 0.1 | 804 | 82 | 11.2 | 24 |
| Example 3-2 | | 0.5 | 805 | 82 | 11.4 | 26 |
| Example 3-3 | LSA | 0.1 | 802 | 83 | 11.2 | 23 |
| Example 3-4 | | 0.5 | 804 | 83 | 11.2 | 23 |
| Example 3-5 | EMC | 0.1 | 801 | 81 | 10.5 | 25 |
| Example 3-6 | | 0.5 | 802 | 81 | 10.9 | 26 |
| Example 3-7 | VL | 0.1 | 810 | 82 | 10.7 | 25 |
| Example 3-8 | | 0.5 | 811 | 82 | 9.4 | 25 |
| Example 3-9 | VMC | 0.1 | 803 | 83 | 10.5 | 25 |
| Example 3-10 | | 0.5 | 803 | 83 | 10.1 | 26 |
| Example 3-11 | PL | 0.1 | 805 | 82 | 11.0 | 24 |
| Example 3-12 | | 0.5 | 806 | 81 | 11.2 | 25 |
| Example 3-13 | CPL | 0.1 | 805 | 82 | 10.6 | 24 |
| Example 3-14 | | 0.5 | 807 | 82 | 10.1 | 24 |

TABLE 4

Containing place of the metal salt: electrolytic solution

| Table 4 | Metal salt Type | Content (wt %) | Solvent Type | Content (wt %) | Discharge capacity (mAh) | Capacity retention ratio (%) | Swollenness ratio (%) | Resistance change amount (mΩ) |
|---|---|---|---|---|---|---|---|---|
| Example 4-1 | LA | 0.1 | FEC | 5 | 820 | 83 | 8.3 | 18 |
| Example 4-2 | | 0.5 | | | 822 | 83 | 9.7 | 18 |
| Example 4-3 | LSA | 0.1 | | | 818 | 85 | 7.8 | 17 |

TABLE 4-continued

Containing place of the metal salt: electrolytic solution

| Table 4 | Metal salt Type | Content (wt %) | Solvent Type | Content (wt %) | Discharge capacity (mAh) | Capacity retention ratio (%) | Swollenness ratio (%) | Resistance change amount (mΩ) |
|---|---|---|---|---|---|---|---|---|
| Example 4-4 | | 0.5 | | | 821 | 83 | 8.1 | 16 |
| Example 4-5 | EMC | 0.1 | | | 818 | 83 | 7.2 | 18 |
| Example 4-6 | | 0.5 | | | 818 | 83 | 7.9 | 19 |
| Example 4-7 | VL | 0.1 | | | 824 | 83 | 7.5 | 18 |
| Example 4-8 | | 0.5 | | | 830 | 82 | 6.9 | 21 |
| Example 4-9 | VMC | 0.1 | | | 820 | 83 | 8.0 | 18 |
| Example 4-10 | | 0.5 | | | 821 | 84 | 7.7 | 20 |
| Example 4-11 | PL | 0.1 | | | 822 | 82 | 8.3 | 20 |
| Example 4-12 | | 0.5 | | | 825 | 82 | 8.7 | 20 |
| Example 4-13 | CPL | 0.1 | | | 826 | 83 | 7.9 | 18 |
| Example 4-14 | | 0.5 | | | 827 | 82 | 7.6 | 20 |

Even in the case where the metal salt type was changed, results similar to those of Table 1 and Table 2 were obtained. That is, in the case where the electrolytic solution contained the metal salt (LA or the like), while resistance change amount rise was suppressed, a high discharge capacity and a capacity retention ratio equal to or larger than those shown in Table 1 and Table 2 were obtained. In addition, though the swollenness ratio was slightly increased, the value thereof was kept at the single digit level.

Examples 5-1 to 5-6

Secondary batteries were fabricated by a procedure similar to that of Examples 2-3, 4-6, and 4-8 except that 4,5-difluoro-1,3-dioxolane-2-one (DFEC) or vinylene carbonate (VC) was added as a solvent. Various characteristics thereof were examined, and results illustrated in Table 5 were obtained.

Even in the case where the solvent composition was changed, results similar to those of Table 2 and Table 3 were obtained. That is, in the case where the electrolytic solution contained the metal salt (DLA or the like), while resistance change amount rise was suppressed, a high discharge capacity and a capacity retention ratio equal to or larger than those shown in Table 2 and Table 3 were obtained. In addition, the swollenness ratio was suppressed to be very slightly increased. In particular, in the case where the solvent contained DFEC or VC, the discharge capacity was further increased, and the swollenness ratio was further decreased.

Examples 6-1 to 6-6 and 7-1 to 7-6

Secondary batteries were fabricated by a procedure similar to that of Examples 1-1 to 1-6 and 2-1 to 2-6 except that the containing place of the metal salt was changed from the electrolytic solution to the anode 34. Various characteristics

TABLE 5

Containing place of the metal salt: electrolytic solution

| Table 5 | Metal salt Type | Content (wt %) | Solvent Type | Content (wt %) | Discharge capacity (mAh) | Capacity retention ratio (%) | Swollenness ratio (%) | Resistance change amount (mΩ) |
|---|---|---|---|---|---|---|---|---|
| Example 5-1 | DLA | 0.5 | DFEC | 5 | 813 | 82 | 7.0 | 17 |
| Example 5-2 | EMC | | | | 812 | 82 | 6.8 | 20 |
| Example 5-3 | VL | | | | 815 | 82 | 6.1 | 23 |
| Example 5-4 | DLA | 0.5 | VC | 5 | 825 | 84 | 7.8 | 15 |
| Example 5-5 | EMC | | | | 825 | 82 | 7.4 | 18 |
| Example 5-6 | VL | | | | 827 | 84 | 6.2 | 16 | thereof were examined, and results illustrated in Table 6 and Table 7 were obtained. In this case, in forming the anode active material layer 34B, the same amount of metal salt as that of the case in which the metal salt was contained in the electrolytic solution was contained in the anode mixture.

TABLE 6

Containing place of the metal salt: anode

| Table 6 | Metal salt Type | Content (wt %) | Discharge capacity (mAh) | Capacity retention ratio (%) | Swollenness ratio (%) | Resistance change amount (mΩ) |
|---|---|---|---|---|---|---|
| Example 6-1 | DLA | 0.01 | 802 | 82 | 11.3 | 25 |
| Example 6-2 | | 0.1 | 804 | 82 | 11.3 | 26 |
| Example 6-3 | | 0.5 | 806 | 82 | 11.3 | 26 |
| Example 6-4 | | 1 | 805 | 81 | 11.5 | 27 |
| Example 6-5 | | 2 | 803 | 81 | 11.6 | 27 |
| Example 6-6 | — | — | 799 | 80 | 11.8 | 27 |

TABLE 7

Containing place of the metal salt: anode

| Table 7 | Metal salt Type | Content (wt %) | Solvent Type | Content (wt %) | Discharge capacity (mAh) | Capacity retention ratio (%) | Swollenness ratio (%) | Resistance change amount (mΩ) |
|---|---|---|---|---|---|---|---|---|
| Example 7-1 | DLA | 0.01 | FEC | 5 | 812 | 84 | 5.3 | 17 |
| Example 7-2 | | 0.1 | | | 822 | 84 | 5.2 | 17 |
| Example 7-3 | | 0.5 | | | 825 | 84 | 5.4 | 17 |
| Example 7-4 | | 1 | | | 820 | 83 | 5.6 | 19 |
| Example 7-5 | | 2 | | | 814 | 83 | 5.6 | 21 |
| Example 7-6 | — | — | FEC | 5 | 798 | 82 | 5.8 | 25 |

Even in the case where the anode 34 contained the metal salt, results similar to those of Table 1 and Table 2 were obtained. That is, in the case where the anode 34 contained the metal salt (DLA), compared to the case that the anode 34 did not contain the metal salt, a higher discharge capacity and a higher capacity retention ratio were obtained and the swollenness ratio was suppressed while resistance change amount rise was suppressed. In particular, in the case where the content of the metal salt in the electrolytic solution was from 0.01 wt % to 0.5 wt % both inclusive, higher effects were obtained.

From the results of Table 1 to Table 7, it was found that in the case where the electrolytic solution contained the metal salt having an unsaturated carbon bond, the battery characteristics were improved.

The present application has been described with reference to the embodiment and the examples. However, the present application is not limited to the foregoing aspects, and various modifications may be made. For example, the secondary battery according to the embodiment of the present application is also applicable to a secondary battery in which the anode capacity includes the capacity by inserting and extracting lithium ions and the capacity associated with precipitation and dissolution of lithium metal, and the anode capacity is expressed by the sum of these capacities. In this case, the chargeable capacity of the anode material is set to a smaller value than that of the discharge capacity of the cathode.

Further, in the embodiment and the examples, the description has been given with the specific examples of the case in which the battery structure is the cylindrical type or the laminated film type, and with the specific example in which the battery device has the spirally wound structure. However, applicable structures are not limited thereto. The secondary battery according to the present application is similarly applicable to a battery having other battery structure such as a coin type battery, a square type battery, and a button type battery, or a battery in which the battery device has other structure such as a laminated structure.

Further, in the embodiment and the examples, while the description has been given of the case that lithium is used as an element of the electrode reactant, the element of the electrode reactant is not limited thereto. The element of the electrode reactant may be other Group 1 elements such as Na and K, Group 2 elements such as Mg and Ca, or other light metals such as Al. The effect of the present application is possibly allowed to be obtained without depending on the electrode reactant element type. Thus, even if the electrode reactant element type is changed, similar effect is allowed to be obtained.

Further, in the embodiment and the examples, for the content of the metal salt in the electrolytic solution, the description has been given of the appropriate range derived from the results of the examples. However, the description does not totally deny a possibility that the content is out of the foregoing range. That is, the foregoing appropriate range is the range particularly preferable for obtaining the effects of the present application. Therefore, as long as the effect of the present application is obtained, the content may be out of the foregoing range in some degrees.

It is possible to achieve at least the following configurations from the above-described exemplary embodiments and the modifications of the disclosure.

(1) A secondary battery including:
  a cathode;
  an anode; and
  an electrolytic solution,
  wherein the anode or the electrolytic solution, or both contain a metal salt including an unsaturated carbon bond.
(2) The secondary battery according to (1), wherein the metal salt is a chain metal compound or a cyclic metal compound containing a structure represented by Formula (1) described below,

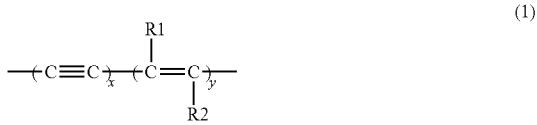

(1)

where each of R1 and R2 is a hydrogen group, a halogen group, an alkyl group, a derivative of an alkyl group, or a metal element belonging to Group 1 to Group 15 in long period periodic table; each of x and y is an integer number equal to or greater than 0; and x+y≥1 is satisfied.
(3) The secondary battery according to (1), wherein the metal salt is an alkali metal salt or an alkali earth metal salt, or both.
(4) The secondary battery according to (1), wherein the metal salt is one or more types of metal acetylide, metal vinylidene, metal vinylene, metal vinyl, metal phenyl, and metal cyclopentadiene.
(5) The secondary battery according to (1), wherein the anode includes a coating layer in part or all of a surface of an anode active material layer, and the coating layer contains the metal salt.
(6) The secondary battery according to (1), wherein the electrolytic solution contains the metal salt, and
  a content of the metal salt in the electrolytic solution is from about 0.01 weight percent to about 0.5 weight percent both inclusive.
(7) The secondary battery according to (1), wherein the electrolytic solution contains a nonaqueous solvent, and
  the nonaqueous solvent contains an unsaturated carbon bond cyclic ester carbonate represented by Formula (2) described below or a halogenated cyclic ester carbonate represented by Formula (3) described below, or both,

(2)

where each of R3 and R4 is a hydrogen group or an alkyl group,

(3)

where each of R5 to R8 is a hydrogen group, a halogen group, an alkyl group, a vinyl group, a halogenated alkyl group, or a halogenated vinyl group; and each of one or more of R5 to R8 is the halogen group, the halogenated alkyl group, or the halogenated vinyl group.
(8) The secondary battery according to (7), wherein the unsaturated carbon bond cyclic ester carbonate is vinylene carbonate, and
  the halogenated cyclic ester carbonate is 4-fluoro-1,3-dioxolane-2-one or 4,5-difluoro-1,3-dioxolane-2-one, or both.
(9) The secondary battery according to (1), wherein the cathode and the anode are opposed to each other with a separator in between, and
  the separator includes a base material layer being a porous film and a polymer compound layer being provided on one surface or both surfaces of the base material layer.
(10) The secondary battery according to (9), wherein the polymer compound layer contains polyvinylidene fluoride.
(11) The secondary battery according to (1), wherein the secondary battery is a lithium ion secondary battery.
(12) An electronic device using the secondary battery according to any one of (1) to (11).
(13) An electric power tool using the secondary battery according to any one of (1) to (11).
(14) An electrical vehicle using the secondary battery according to any one of (1) to (11).
(15) An electric power storage system using the secondary battery according to any one of (1) to (11).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A secondary battery comprising: a cathode including a cathode active material; an anode including an anode active material; and
  an electrolytic solution including an electrolytic salt, an electrolytic solvent, and an alkali metal salt,
  wherein the electrolytic solvent includes 4-fluoro-1,3-dioxolane-2-one, wherein the alkali metal salt is dilithium acetylide in an amount in a range of 0.01 weight percent to 2 weight percent, and wherein the anode includes the alkali metal salt.
2. The secondary battery according to claim 1, wherein the amount of dilithium acetylide in a range of 0.01 weight percent to 0.5 weight percent.
3. The secondary battery according to claim 1, wherein the electrolytic salt is $LiPF_6$.
4. The secondary battery according to claim 1, wherein the electrolytic solvent further includes ethylene carbonate and diethyl carbonate.
5. The secondary battery according to claim 1, wherein the cathode active material includes $LiCoO_2$.
6. The secondary battery according to claim 1, wherein the anode active material includes a carbon material.
7. The secondary battery according to claim 6, wherein the carbon material includes a mesocarbon microbead.
8. An electronic device comprising a secondary battery according to claim 1.
9. An electronic power tool comprising a secondary battery according to claim 1.

10. An electric vehicle comprising a secondary battery according to claim 1.

11. An electric power storage system comprising a secondary battery according to claim 1.

* * * * *